United States Patent [19]

Hodgkinson et al.

[11] Patent Number: 5,107,358
[45] Date of Patent: Apr. 21, 1992

[54] METHOD AND APPARATUS FOR TRANSMITTING INFORMATION

[75] Inventors: Terence G. Hodgkinson, Woodbridge; Andrew R. Cook, Clacton On Sea, both of England

[73] Assignee: British Telecommunications Public Limited Company, England

[21] Appl. No.: 603,708
[22] PCT Filed: Apr. 4, 1989
[86] PCT No.: PCT/GB89/00343
§ 371 Date: Nov. 15, 1990
§ 102(e) Date: Nov. 15, 1990
[87] PCT Pub. No.: WO89/10030
PCT Pub. Date: Oct. 19, 1989

[30] Foreign Application Priority Data

Apr. 6, 1988 [GB] United Kingdom ............... 8808043

[51] Int. Cl.⁵ ................... H04B 10/00; H04J 1/00
[52] U.S. Cl. .................... 359/124; 359/156; 359/181; 359/173
[58] Field of Search ............. 455/616, 619, 612, 617, 455/611, 610, 618; 370/2, 3; 359/156, 124, 173, 181

[56] References Cited

U.S. PATENT DOCUMENTS 2,707,749  5/1955  Mueller .................. 359/156
3,457,414  7/1969  Ragen et al. 3 ........... 59/156
5,008,958  4/1991  Cimini, Jr. et al. ........ 455/616

FOREIGN PATENT DOCUMENTS 850110     9/1960  United Kingdom .
A 86/07658 12/1986 World Int. Prop. O. .

OTHER PUBLICATIONS

Electronics Letters, vol. 24, No. 6, 17 Mar. 1988 (Stevenage GB), L. J. Cimini et al., "Polarisation-Insensitive Coherent Lightwave System Using Wide-Deviation FSK and Data-Induced Polarisation Switching", pp. 358-360.
(a) Hodgkinson, "Receiver Analysis for Synchronous Coherent Optical Fibre Transmission Systems", J. Lightwave Tech., vol. LT-5, No. 4, Apr. 1987, pp. 573-586.
(b) Harmon et al., "Polarization Control in a Coherent Optical Fibre System Using a Dither Technique", SPIE, vol. 734, Fibre Optics '87 (1987), pp. 63-67.
(c) Hodgkinson et al., "Polarization-Insensitive Hetrodyne Detection Using Polarization Scrambling", Elec. Ltrs., vol. 23, No. 10, 7 May 1987, pp. 513-514.
(d) Kersey et al., "New Polarization-Insensitive Detection Technique for Coherent Optical Fibre Hetrodyne Communications", Elec. Ltrs., vol. 23, No. 18, 27 Aug. 1987, pp. 924-925.
(e) Glance, "Polarization Independent Coherent Optical Receiver", J. Lightwave Technology, vol. Lt-5, No. 2, Feb. 1987, pp. 274-276.
(f) Tzeng, "Polarization-Insensitive Coherent Receiver Using a Double Balanced Optical-Hybrid System", Elec. Ltrs., vol. 23, No. 22, 22 Oct. 1987, pp. 1195-1196.
(g) Kreit et al., "Polarization-Insensitive Optical Hetrodyne Receiver for Coherent FSK Communications", Elc. Ltrs., vol. 23, No. 4, 12 Feb. 1987, pp. 168-169.
(h) Cimini et al., "A Polarization-Insensitive Coherent Lightwave System Using Wide-Deviation FSK and Data-Induced Polarization Switching", AT&T, Bell Labs, PD18-1 through PD18-4, Elec. Ltrs., 1988.

Primary Examiner—Reinhard J. Eisenzopf
Assistant Examiner—Kinfe-Michael Negash
Attorney, Agent, or Firm—Nixon & Vanderhye

[57] ABSTRACT

A method and apparatus for transmitting information comprises a signal generator (1) for continuously generating a pair of optical signals (f1, f2). These signals are similarly modulated in a modulator (5) with information to be transmitted and are combined with their polarizations substantially orthogonal. The combined signals are transmitted with the portions of each signal modulated with the same information being transmitted together down an optical fiber.

16 Claims, 7 Drawing Sheets

TRANSMITTER CONFIGURATIONS

ASK

FSK

PSK

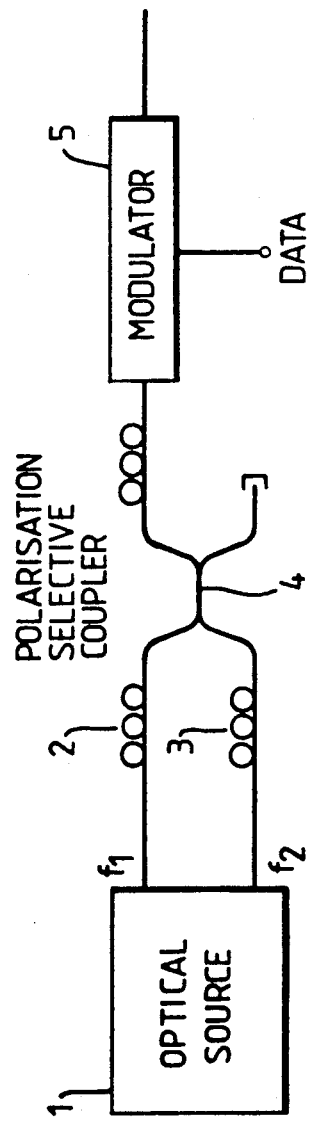
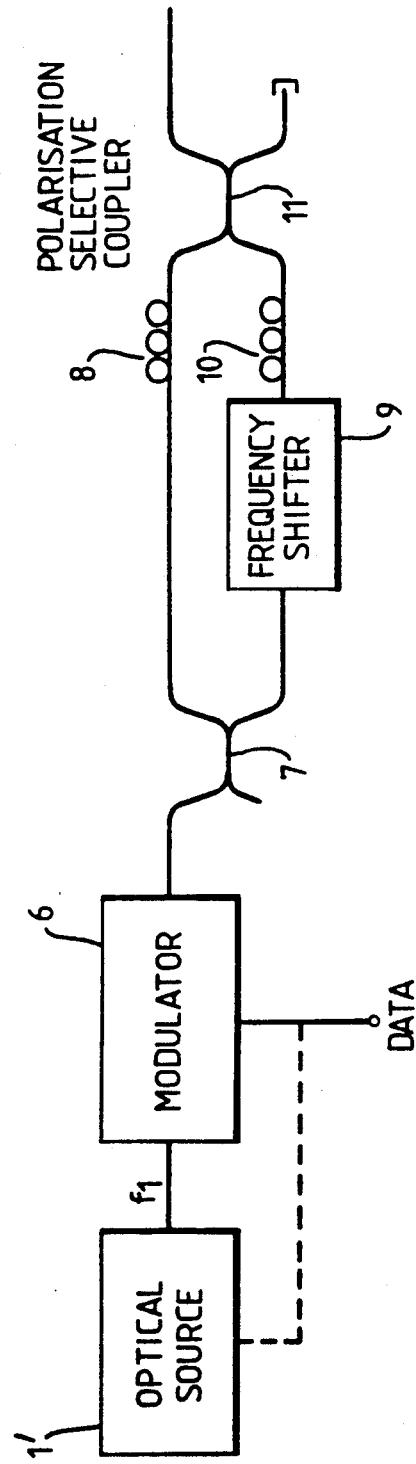

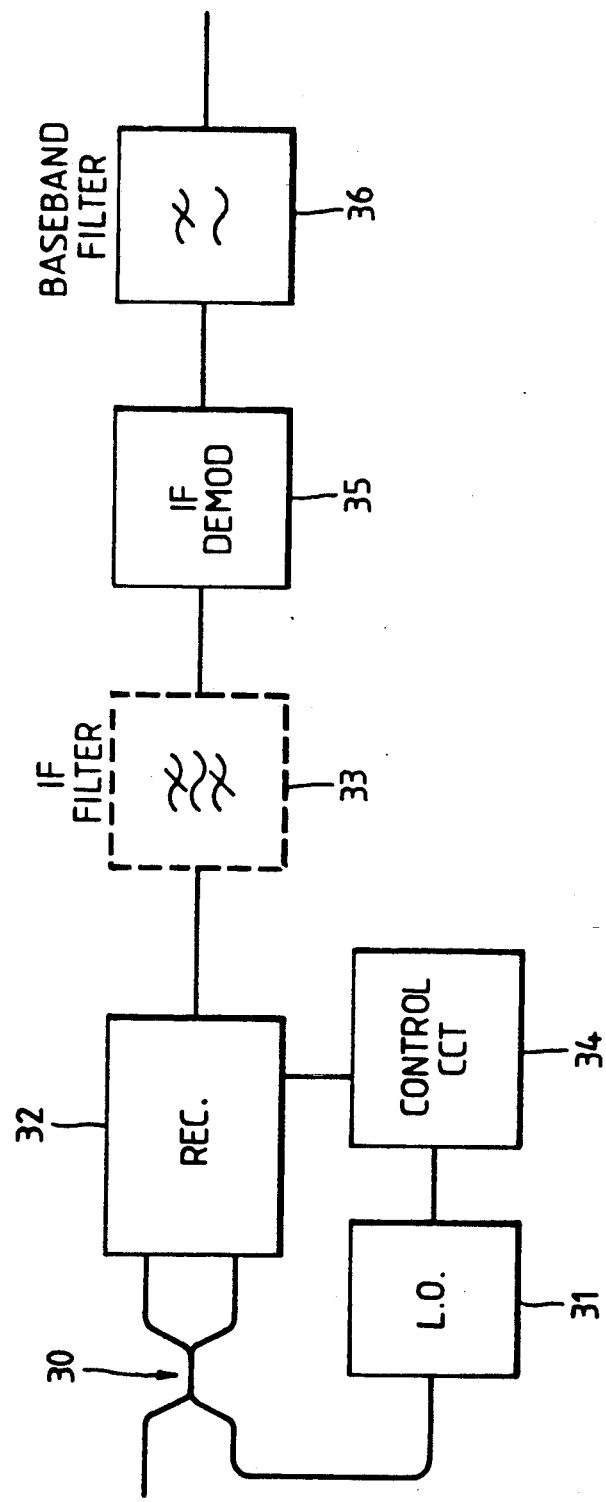

RECEIVER CONFIGURATION

FIG. 8a
ASSEMBLED MULTIPLEX
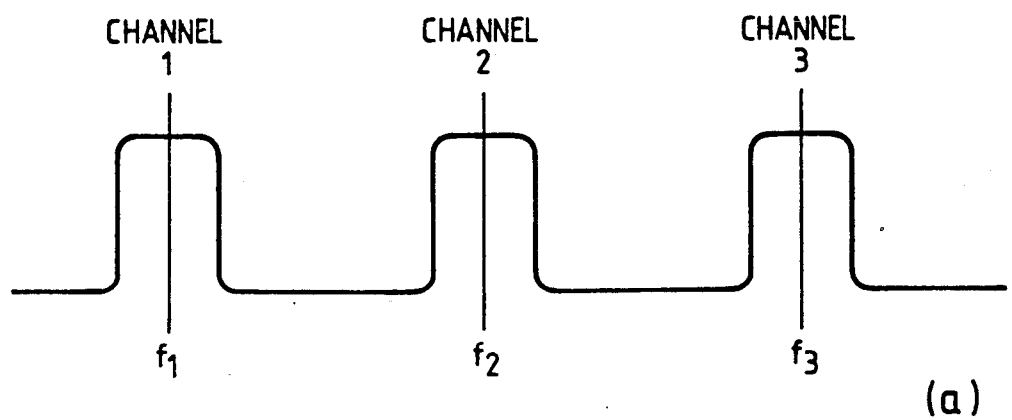
(a)
PROCESSED MULTIPLEX
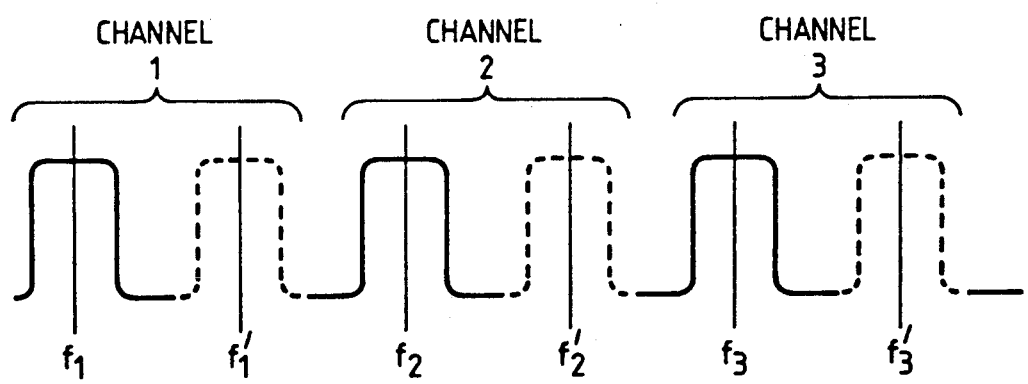
$f'_n - f_n$ = FREQUENCY SHIFT APPLIED BY THE PROCESSING
FIG. 8b

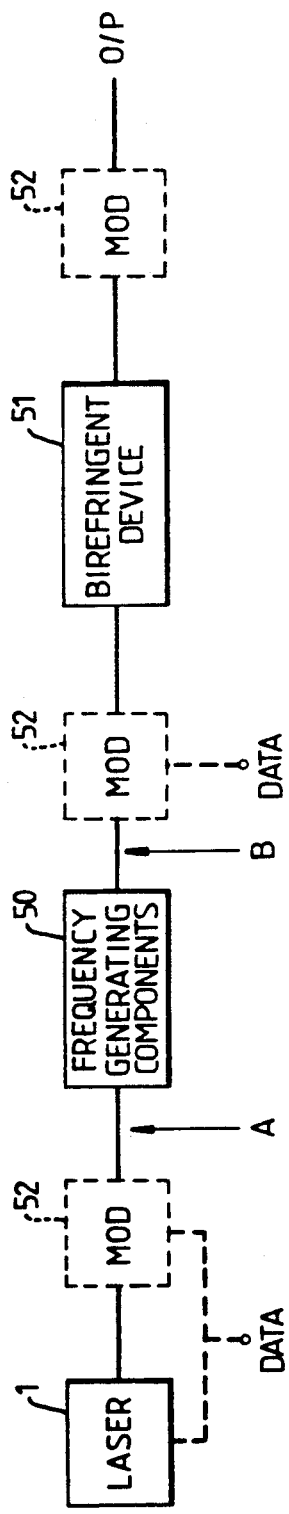
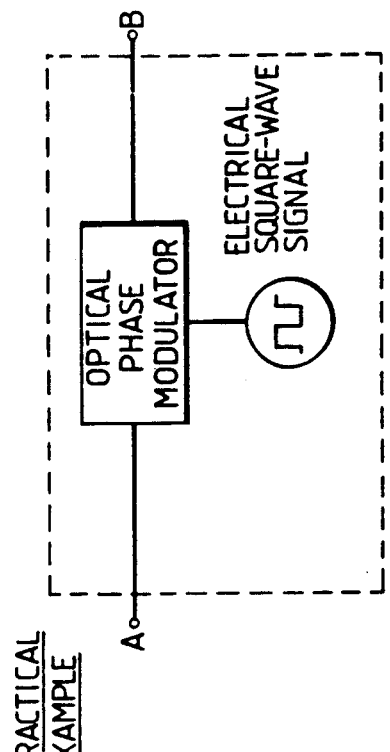
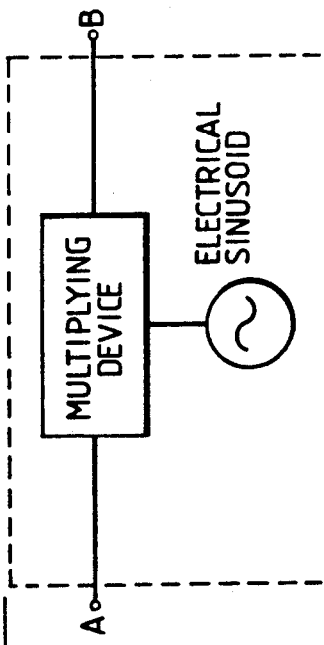

METHOD AND APPARATUS FOR TRANSMITTING INFORMATION

The invention relates to methods and apparatus for transmitting information.

It is well known that conventional coherent optical detection systems only give optimum performance when the signal and local oscillator polarisations are identical. For practical systems this represents a problem because an optical signal propagating through a conventional single-mode fibre undergoes random polarisation changes and this causes the received polarisation state to be both indeterminate and time varying. To date this problem has been overcome using a variety of techniques including polarisation tracking receivers, polarisation diversity receivers, and polarisation scrambling.

It is a known property of many transmission media, including optical waveguides such as optical fibres, that although random changes in absolute polarisation may take place during transmission through the medium, these random variations are the same for each signal so that a pair of signals which are initially orthogonally polarised will remain orthogonal.

An article entitled "A polarization-insensitive coherent lightwave system using wide-deviation FSK and data-induced polarization switching" by L. J. Cimini et al, Electronic Letters Vol 23 December 1987 pp 1365-1366 discloses a polarisation-insensitive technique taking advantage of the stable orthogonal relationship of two polarisation states in which the frequency shift in an FSK signal induces polarisation switching by introducing a passive device with high birefringence in the path of the transmitted signal. Thus, as the signal switches from one frequency to another, its polarisation switches between mutually orthogonal polarisation states. However such a technique is useful only with FSK modulation.

In accordance with one aspect of the present invention, a method of transmitting information comprises launching a pair of orthogonal polarised optical signals having different frequencies, each of which is identically modulated with the information to be transmitted, into an optical waveguide which causes the signals to undergo random polarisation changes during propagation through the waveguide and detecting said signals after propagation through the waveguide by means of a coherent optical receiver.

Thus, at the receiver, irrespective of the polarisation of the local oscillator signal, two electrical interference signals will be generated after the optical mixing process with their amplitudes varying in antiphase only one of which can be zero at a given time.

In accordance with a second aspect of the present invention, an optical network comprises signal generating means for generating a pair of orthogonally polarised signals having different frequencies and being modulated in accordance with the information to be transmitted; and transmitting means for transmitting the modulated signals with the portions of each signal modulated with the same information being transmitted together.

The invention may be used with a wide variety of different types of signal but is particularly suitable for use with signals having frequencies within the optical band. In that case, the transmission medium will comprise an optical waveguide such as an optical fibre.

In one example, the signal generating means comprises carrier signal generating means for generating signals with two frequencies, combining means for combining the two signal with the polarisation of one signal orthogonal to the other, and modulating means for modulating the signals in accordance with the information to be transmitted.

The modulating means may be positioned downstream of the combining means although it would also be possible to provide modulating means for modulating each of the two signals separately, the signals subsequently being combined.

In a second example, the signal generating means comprises carrier signal generating means for generating two carrier signals with different frequencies, signal coupling means for coupling the two signals, the coupled signals being fed to the modulating means, and a birefringent device downstream of the modulating means for imparting the orthogonal polarisations on the two modulated carrier signals in response to their frequencies. Alternatively the carrier signals could be individually modulated prior to being coupled while the birefringent device could be upstream of the modulating means.

In a third example, the signal generating means comprises a carrier signal generating means for generating a single carrier signal; modulating means for modulating the carrier signal in accordance with the information to be transmitted; and means for generating the two orthogonally polarised and frequency shifted versions of the carrier signal.

The means for generating the orthogonally polarised signals may comprise a signal splitter for generating two versions of the modulated carrier signal, frequency shifting means for shifting the frequency of one of the two versions, polarisation control means for adjusting the polarisation of the signals to be orthogonal to each other, and combining means for combining the orthogonally polarised versions of the modulated carrier signal.

In one arrangement the polarisation control means could be provided by the signal splitter which in the case of an incoming linear signal with 45° polarisation would split them into two orthogonally polarised signals.

Typically, the modulating means will be provided separately from the means for generating the carrier signal or signals but in some cases, the modulating means could be formed by part of the carrier signal generating means so that the signal generated is already modulated. Thus, in the case of a laser, for example, this could be directly modulated by the information.

The invention is also suitable for transmitting frequency multiplexed optical signals. Thus, in accordance with a third aspect of the present invention, apparatus for transmitting a signal comprising a number of frequency multiplexed channels comprises means for generating a second version of the multiplex signal having frequencies different from those of the multiplex signal; and means for transmitting the two versions of the signal with orthogonal polarisations and with the portions of each signal corresponding to the same channel being transmitted together.

In accordance with a fourth aspect of the present invention, a method of transmitting a signal comprising a number of frequency multiplexed channels comprises generating a second version of the multiplex signal having frequencies different from those of the multiplex signal; and transmitting the two versions of the signal with orthogonal polarisations and with the portions of each signal corresponding to the same channel being transmitted together.

Examples of methods and apparatus in accordance with the present invention will now be described with reference to the accompanying drawings, in which:-

FIG. 2 illustrates a first example of a transmitter;

FIG. 3 illustrates a second example of a transmitter;

FIG. 6 illustrates a first example of a receiver for receiving an ASK modulated signal;

FIGS. 8a and 8b illustrate a frequency mulitplexed signal before and after processing in accordance with the invention respectively;

FIG. 9 illustrates a generalised form of transmitter; and,

FIGS. 10a and 10b illustrate examples of apparatus for generating two carrier signals.

Figure 1A:
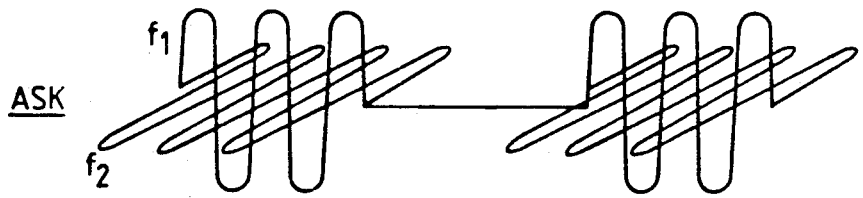
FIGS. 1a-1c illustrate signals modulated in accordance with ASK, FSK, and PSK methods respectively.

If two orthogonal optical carriers with different frequencies are modulated and transmitted through a birefringent medium the received optical field ($e_s$), can be expressed generally as $$e_S = E_S[\sqrt{(K_{SX})} \cos(\omega_{S1}t + m_{1(t)}) + j\sqrt{(K_{SY})} \cos(\omega_{S1}t + \delta_S + m_{1(t)})]m_{2(t)}$$
$$+ E_S[\sqrt{K_{SY}} \cos(\omega_{S2}t + m_{1(t)}) - j\sqrt{(K_{SX})} \cos(\omega_{S2}t + \delta_S + m_{1(t)})]m_{3(t)} \quad (1)$$

Complex notation is used to indicate orthogonal field components, $\omega_{S1}$, $\omega_{S2}$ are the two optical carrier frequencies, $K_{SX}$, $K_{SY}$ represent the fraction of the received optical power in orthogonal X and Y planes and $\delta_S$ is the phase relationship between the two signals. $m_{1(t)}$, $m_{2(t)}$ and $m_{3(t)}$ are modulation parameters; $m_{1(t)}$ represents phase or frequency modulation and the other two represent amplitude. This notation is described in more detail in HODGKINSON T.G.: Receiver analysis for synchronous coherent optical fibre transmission systems, IEEE. j. Lightwave Technol. 1987, LT-5, pp. 573-586.

$e_S$ can be detected using coherent (homodyne or heterodyne) techniques or $e_S^2$ can be detected using direct detection for certain types of modulation such as ASK. Heterodyne detection will be described in detail but the results can be taken as being generally applicable to the other types of detection. The normalised input to the heterodyne receiver's baseband filter ($v_{I/P}$), when using non-synchronous (square-law) IF demodulation, is $$v_{I/P} = (K_{P1} + K_{P2})K_m f_{(t)} \quad (2)$$

and for synchronous (linear) IF demodulation it is $$v_{I/P} = (\sqrt{K_{P1}} + \sqrt{K_{P2}})K_m f_{(t)} \quad (3)$$

where $$K_{P1} = K_{SX}K_{LX} + K_{SY}K_{LY} + 2\sqrt{(K_{SX}K_{LX}K_{SY}K_{LY})} \cos(\delta_L - \delta_S) \quad (4)$$

$$K_{P2} = K_{SY}K_{LX} + K_{SX}K_{LY} - 2\sqrt{(K_{SX}K_{LX}K_{SY}K_{LY})} \cos(\delta_L - \delta_S) \quad (5)$$

$K_{LX}$, $K_{LY}$ and $\delta_L$ are local oscillator polarisation parameters similar to $K_{SX}$, $K_{SY}$, $\delta_S$; $K_m$ is determined by the modulation format and $f_{(t)}$ represents the digital modulation and takes the value 1 or 0.

Substituting equations (4) and (5) into (1) and (2) shows that for all possible signal/local osillator polarisation combinations $v_{I/P}$ is constant for non-synchronous IF demodulation and varies by $\sqrt{2}$ for synchronous demodulation; when at a minimum this equals the non-synchronous $v_{I/P}$ value. However, irrespective of which type of IF demodulation is used the worst case performance should never be more than 3 dB worse than standard polarisation aligned heterodyne detection.

Some examples of possible waveforms $e_S$ are given in FIG. 1. In each case the binary digits 1 0 1 are being transmitted. In FIG. 1a, ASK modulation is used, the two different and orthogonally polarised frequencies being denoted $f_1$, $f_2$. Both frequencies are attenuated to zero for a binary zero.

Figure 1B:
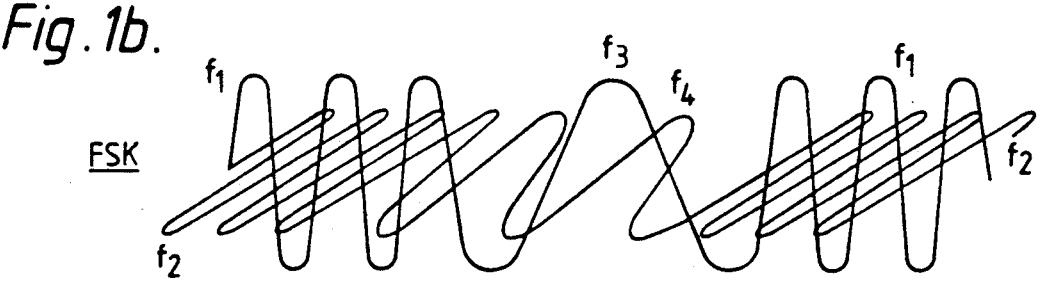

In FIG. 1b, an FSK system is shown in which a binary 1 is represented by the orthogonally polarised frequencies $f_1$, $f_2$ while a binary zero is represented by orthogonally polarised frequencies $f_3$, $f_4$ (different from $f_1$ and $f_2$).

Figure 1C:
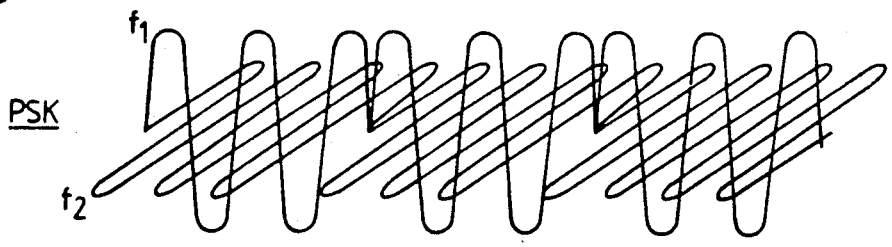

FIG. 1c illustrates a PSK system with the two binary data values being represented by the frequencies $f_1$, $f_2$ both of which are shifted in phase by 180° for the two values.

The first example of a transmitter is shown in FIG. 2 and comprises an optical source 1 to be described in more detail below which generates two coherent carrier signals with the frequencies $f_1$, $f_2$. These signals are fed to respective polarisation controllers 2, 3 which adjust the signals to become orthogonally polarised. These polarised signals are fed to a polarisation selective coupler 4 which combines the signals together and feeds the combined signals to a modulator 5. The signals are then modulated by the modulator 5 in accordance with the data to be transmitted, the resultant signal taking one of the forms shown in FIGS. 1a to 1c depending upon the form of the modulation.

A second transmitter is shown in FIG. 3 in which the optical source 1' generates a single carrier signal with the frequency $f_1$ which is fed to a modulator 6. Once again, the modulator 6 imparts the required modulation onto the carrier and the resultant modulated carrier is fed to an optical splitter 7 which generates two versions of the modulated signal. The first version is fed to a polarisation controller 8 while the second version is fed via a frequency shifting circuit 9 to a polarisation controller 10. The frequency shifter 9 adjusts the frequency of the incoming signal so that the signal output from the frequency shifting circuit 9 has a carrier frequency $f_2$ and the polarisation of this signal is then adjusted by the controller 10 to be orthogonal to the polarisation of the signal $f_1$ from the controller 8. The orthogonally polarised signals are then combined by a polarisation selective coupler 11 for transmission. It will be understood that a suitable delay will be provided in the path to the controller 8 to compensate for any delays in the frequency shifter 9.

In some cases, the modulator 6 can be dispensed with and the optical source 1 could be controlled directly by the data to generate a modulated output signal as indicated by the dashed line in FIG. 3.

Figure 4B:
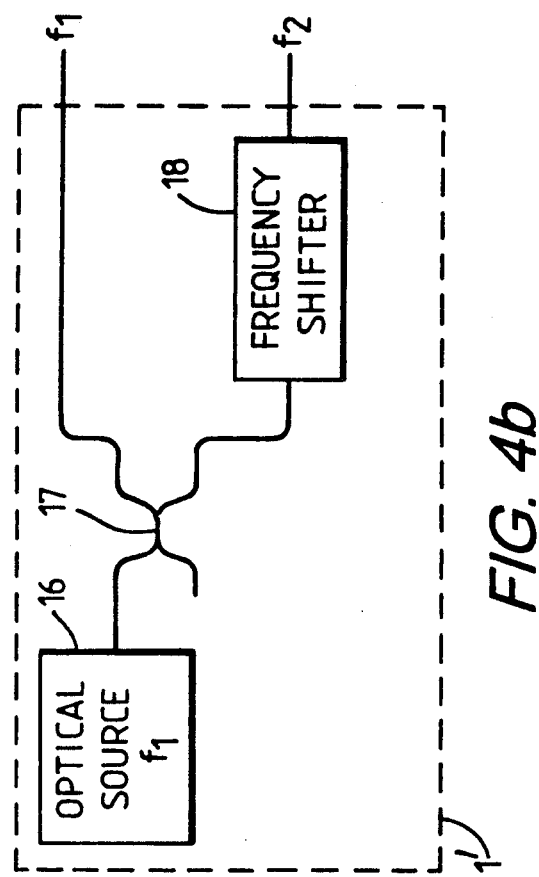
FIGS. 4a and 4b illustrate two forms of signal source for use in the FIG. 2 example.
Figure 4A:
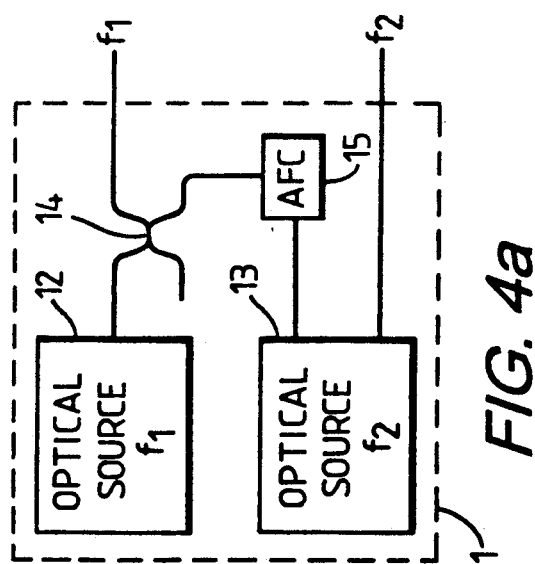

FIG. 4a illustrates an example of the optical source 1 of FIG. 2. In this case, two sources 12, 13, such as lasers, are provided for generating the carrier signals $f_1$, $f_2$ respectively. The signal $f_1$ is sampled by a splitter 14 and fed back via a control circuit 15 to the optical source 13 so as to ensure that the frequency $f_2$ is kept constant relative to the frequency $f_1$.

An example of the construction of the optical source 1' of FIG. 3 is shown in FIG. 4b. In this case, a single laser 16 generates a signal $f_1$ which is fed to a splitter 17 which generates two versions of the signal. One version is fed out of the source 1' as the carrier signal $f_1$ while the other signal is fed to a frequency shifting circuit 18 which adjusts the incoming frequency to $f_2$.

Figure 5:
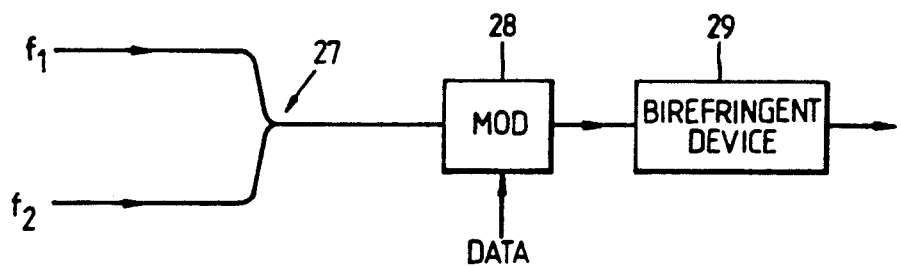
FIG. 5 illustrates a third example of a transmitter.

FIG. 5 illustrates a third transmitter configuration in which unmodulated, carrier signals with frequencies $f_1$, $f_2$ are combined in an optical coupler 27, the combined signal being fed to a modulator 28 controlled by the data signal. The modulated signal is then fed to a (passive or active) birefringent device or medium which has a characteristic such that the incoming carrier frequencies $f_1$, $f_2$ are caused to become orthogonally polarised.

FIG. 9 illustrates a generalised form of transmitter for which FIG. 5 is a particular example. In the FIG. 9 example, a laser 1 generates an optical signal at a particular frequency which is fed to a device 50 for generating from the incoming signal A two signals having different frequencies B. These signals are then fed to a birefringent device 51 which rotates the polarisations of the two frequencies so that they are mutually orthogonal. In order to modulate data onto the two polarised signals, the data can be used to modulate the laser 1 directly or can be used to control a modulator 52 positioned at any one of the three positions shown in FIG. 9.

FIG. 10 illustrates an example of a modulator for use in this invention, such as the modulator 52. It is well known that when two electrical sinusoidal signals (in general one only need be sinusoidal so the other could be a modulated carrier) are multipled the resulting output spectrum consists of sum and difference frequencies only.

$$2 \cos(\omega_1 t) \cos(\omega_2 t) = \cos((\omega_1 - \omega_2)t) + \cos((\omega_1 + \omega_2)t)$$

This is commonly referred to as double sideband suppressed carrier (DSB-SC).

It follows from the above that if a device existed which effectively multiplied an electrical signal and an optical signal, two optical signals, separated by twice the frequency of the electrical signal, could be generated from a single optical source (FIG. 10a). In practice this multiplying function may have to be approximated using, for example, the arrangement shown in FIG. 10b. The reason why this technique is approximate is that the harmonics of the electrical square wave also produce optical frequency components, but with correct system design this would only appear as a loss of signal power. This problem cannot be overcome by using a sinusoidal electrical signal because this generates additional optical frequency components according to the Bessel functions.

A simple form of receiver configuration for demodulating an ASK modulated signal of the form shown in FIG. 1a is illustrated in FIG. 6. The incoming signal is fed into one input arm of an optical coupler 30 and a local oscillator frequency is fed into the other input arm of the coupler 30. This local oscillator signal comes from a local oscillator 31. The two output signals from the coupler 30, which correspond to mixed versions of the two orthogonally polarised incoming signals with the local oscillator signal, are fed to an optical receiver 32 such as photodetector and associated electronics which generates a corresponding output electrical signal which is fed to an IF filter 33. The IF filter bandwidth will typically be twice the bit-rate in Hertz + $f_2 - f_1$. A filter 33 is shown as a dashed box because it may not be essential when using synchronous IF demodulation. The local oscillator frequency is controlled by a control circuit 34 which monitors the frequency of the mixed signal received by the receiver 32.

The IF signal is fed to an IF demodulator circuit 35 which may operate on a square law principle. Since the incoming signal has been ASK modulated, the result of squaring a mixed IF frequency will yield a zero amplitude signal (binary 0) or a fixed, positive amplitude signal (binary 1) which is fed to a base band filter 36.

It should be noted that since the incoming, modulated signal comprises two orthogonally polarised components, there will always be at least one signal resulting from the mixing of the (non-zero amplitude) modulated signal with the local oscillating frequency and the problem of fading will not arise.

Figure 7:
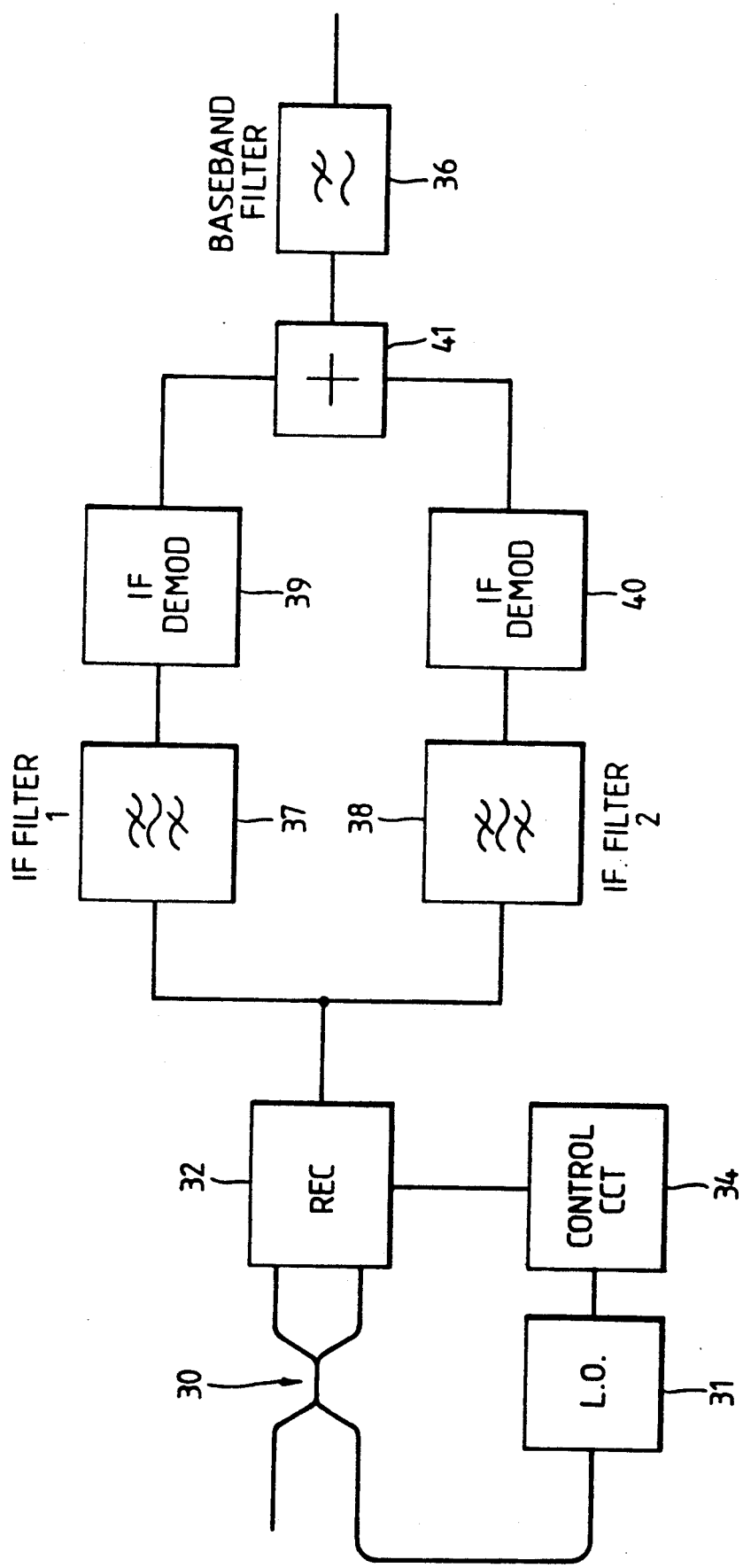
FIG. 7 illustrates a second form of receiver.

FIG. 7 illustrates a more generalised receiver configuration which can be used to demodulate any of the signal types shown in FIG. 1. In contrast to the FIG. 6 example in which the bandwidth of the IF filter 33 must be sufficient to include both mixed signals, in the FIG. 7 example, the mixed signals are split and passed through separate IF filters 37, 38. For the waveforms of FIGS. 1a and 1c, these will be set in a similar way to a standard FSK receiver with each filter passing a respective signal corresponding to the mixing of either $f_1$ or $f_2$ with the local oscillator frequency. In the case of the FIG. 1b signal, the IF filter bandwidths must be increased and values equivalent of those for the receiver configuration in FIG. 6 are needed. The filtered signals are demodulated in respective demodulator circuits 39, 40 which may operate on a square law principle and the demodulated signals are then fed to a combining circuit 41 which effectively inverts and adds one of the signals to the other, the resultant signal being fed to the baseband filter 36.

In a still more generalised form, each arm of FIG. 7 (comprising a filter and demodulator) could be doubled up to provide one arm for each IF.

It is also possible to use the invention to transmit a frequency multiplex. The advantage of this is that the component needed to produce the orthogonal optical carriers is not required at every transmitter so that one per transmission waveguide is all that is needed. After assembling the frequency multiplex with the appropriate frequency separations (FIG. 8a), the multiplex signal is processed using the device shown in FIG. 3 with the multiplex signal being supplied to the splitter 7 in place of the signal from the optical source 1' and modulator 6. The output signal from this configuration will have the form shown in FIG. 8b. The pair of frequencies associated with each channel will be orthogonally polarised.

It should be understood that in all the examples described, the two optical carrier frequencies will typically be separated by two to three times the bit rate in hertz.

We claim:

1. A method of transmitting information comprising launching a pair of orthogonal polarised optical signals having different frequencies, each of which is identically modulated with information to be transmitted, into an optical waveguide which can cause the signals to undergo random polarisation changes during propagation through the waveguide and detecting said signals after propagation through the waveguide by means of a coherent optical receiver.

2. A method as claimed in claim 1 including the step of generating a pair of optical signals having different frequencies and orthogonal polarisations and modulating the signals identically with the information.

3. A method as claimed in claim 2 in which the optical signals are modulated after being combined.

4. A method as claimed in claim 1 including the step of generating a pair of optical carrier signals of different frequencies, combining the optical signals, modulating the combined signals, and feeding the modulated combined signals to a birefringent device which imparts the orthogonal polarisations on the two modulated optical carrier signals in response to their different frequencies.

5. A method as claimed in claim 1 including the steps of generating a single optical carrier signal, modulating the carrier signal in accordance with the information to be transmitted, and generating the pair of orthogonally polarised optical carrier signals of different frequencies.

6. A method as claimed in claim 5 in which the orthogonally polarised optical signals are generated by taking the modulated, single optical carrier signal, generating two versions of this signal, shifting the frequency of one version relative to the other, adjusting the polarisation of the signals to be orthogonal to each other and combining the orthogonally polarised versions of the modulated carrier signal.

7. A method of transmitting a signal comprising a number of frequency multiplexed channels, the method comprising generating a second version of the multiplex signal having frequencies different from those of the multiplex signals; and transmitting the two versions of the signal with orthogonal polarisations and with the portions of each signal corresponding to the same channel being transmitted simultaneously into an optical waveguide which can cause the signals to undergo random polarisation changes during propagation through the waveguide; and detecting said signals after propagation through the waveguide by means of a coherent optical receiver.

8. An optical network comprising an optical waveguide which can cause optical signals to undergo random polarisation changes during propagation through the waveguide, generating means for generating a pair of orthogonally polarised signals having different frequencies, each of which is identically modulated in accordance with information to be transmitted, and means for launching the signals simultaneously into the optical waveguide and a coherent detector for detecting said signals.

9. A network according to claim 8, wherein the signal generating means comprises optical carrier signal generating means for generating signals with two frequencies, combining means for combining the two signals with the polarisation of one signal orthogonal to the other, and modulating means for modulating the signals identically in accordance with the information to be transmitted.

10. A network according to claim 9, wherein the modulating means is positioned downstream of the combining means.

11. A network according to claim 8, wherein the signal generating means comprises carrier signal generating means for generating two carrier signals with different frequencies, signal coupling means for coupling the two signals, the coupled signals being fed to the modulating means, and a birefringent device downstream of the modulating means for imparting the orthogonal polarisations on the two modulated carrier signals in response to their frequencies.

12. A network according to claim 8, wherein the signal generating means comprises a carrier signal generating means for generating a single carrier signal; modulating means for modulating the carrier in accordance with the information to be transmitted; and means for generating the two orthogonally polarised and frequency shifted versions of the carrier signal.

13. A network according to claim 12, wherein the means for generating the orthogonally polarised signals comprises a signal splitter for generating two versions of the modulated carrier signal, frequency shifting means for shifting the frequency of one of the two versions, polarisation control means for adjusting the polarisation of the signals to be orthogonal to each other, and combining means for combining the orthogonally polarised versions of the modulated carrier signal.

14. A network according to claim 8, wherein the modulating means is separate from the means for generating the carrier signal or signals.

15. A network according to claim 8, wherein the modulating means modulates the carrier signal or signals in accordance with an ASK, FSK, or PSK system.

16. A network for transmitting a signal comprising a number of frequency multiplexed channels comprises means for generating a second version of the multiplex signal having frequencies different from those of the multiplex signal, and means for transmitting the two versions of the signal with orthogonal polarisations and with the portions of each signal corresponding to the same channel being transmitted simultaneously into an optical waveguide which can cause random polarisation changes during propagation through the waveguide and a coherent optical detector for detecting said signals.

* * * * *